(12) United States Patent
Krammer

(10) Patent No.: US 8,225,653 B2
(45) Date of Patent: Jul. 24, 2012

(54) LEVEL SENSOR FOR CRYOGENIC LIQUIDS, AND RECEPTACLE COMPRISING SUCH A LEVEL SENSOR

(75) Inventor: Gert Krammer, Graz (AT)

(73) Assignee: Magna Steyr Fahrzeugtechnik AG & Co. KG, Graz (AT)

( * ) Notice: Subject to any disclaimer, the term of this patent is extended or adjusted under 35 U.S.C. 154(b) by 791 days.

(21) Appl. No.: 12/281,813

(22) PCT Filed: Mar. 6, 2007

(86) PCT No.: PCT/AT2007/000113
§ 371 (c)(1),
(2), (4) Date: Feb. 5, 2009

(87) PCT Pub. No.: WO2007/101286
PCT Pub. Date: Sep. 13, 2007

(65) Prior Publication Data
US 2009/0223289 A1 Sep. 10, 2009

(30) Foreign Application Priority Data
Mar. 6, 2006 (AT) ................. GM164/2006

(51) Int. Cl.
*G01F 23/00* (2006.01)
(52) U.S. Cl. ......... 73/290 R; 73/291; 73/292; 73/304 R; 174/68.1
(58) Field of Classification Search ............... 73/304 R, 73/304 C
See application file for complete search history.

(56) References Cited

U.S. PATENT DOCUMENTS

| | | | | | |
|---|---|---|---|---|---|
| 3,880,193 | A | * | 4/1975 | Lewis | 138/26 |
| 4,984,457 | A | * | 1/1991 | Morris | 73/149 |
| 5,142,874 | A | * | 9/1992 | Maric | 62/49.2 |
| 5,908,985 | A | | 6/1999 | Maatuk | |
| 6,622,557 | B2 | * | 9/2003 | Petzold | 73/304 C |
| 6,925,873 | B2 | | 8/2005 | Xu et al. | |
| 6,936,788 | B2 | | 8/2005 | Dietrich | |
| 6,959,599 | B2 | * | 11/2005 | Feldstein et al. | 73/304 R |
| 7,041,906 | B2 | * | 5/2006 | John | 174/68.1 |
| 7,107,838 | B2 | * | 9/2006 | Chai et al. | 73/304 R |
| 2003/0177826 | A1 | * | 9/2003 | Adkadkam et al. | 73/304 C |
| 2006/0021431 | A1 | * | 2/2006 | Immel | 73/304 C |
| 2008/0156091 | A1 | * | 7/2008 | Hickman et al. | 73/304 R |

FOREIGN PATENT DOCUMENTS

| | | |
|---|---|---|
| CH | 675912 A5 | 11/1990 |
| DE | 2615407 A1 | 10/1977 |
| EP | 1084912 | 3/2001 |

(Continued)

*Primary Examiner* — Hezron E Williams
*Assistant Examiner* — Hoang Nguyen
(74) *Attorney, Agent, or Firm* — Bachman & LaPointe, P.C.

(57) ABSTRACT

A filling level detector for cryogenic liquids which are located in a container (1) uses a probe with a superconductor. In order to provide a filling level detector which is insensitive and costs little, the probe (11) is a flat conductor (20) which comprises a plurality of conductors which are routed parallel in a plastic matrix (21), of which a first conductor (23) is a super conductor,
second conductors (24) are used to supply heating current to the first conductor (23), and
third conductors (25; 25, 26) are used for voltage measurement, with the conductors in one pair (24, 25, 26) each being connected to points (27, 28 and 29, 30) which are at a distance from one another in the longitudinal direction of the probe. The probe is guided in a guide in the container.

5 Claims, 3 Drawing Sheets

FOREIGN PATENT DOCUMENTS

| | | |
|---|---|---|
| JP | 63083615 A | 4/1988 |
| JP | 10332458 A | 12/1998 |
| RU | 2188397 C1 | 8/2002 |
| WO | 91/08449 A1 | 6/1991 |
| WO | 2005124294 A1 | 12/2005 |

* cited by examiner

LEVEL SENSOR FOR CRYOGENIC LIQUIDS, AND RECEPTACLE COMPRISING SUCH A LEVEL SENSOR

BACKGROUND OF THE INVENTION

The invention relates to a filling level detector for cryogenic liquids which are located in a container, which filling level detector comprises a probe, which is immersed in the liquid, and an electronics part, with a superconducting line section and a heating apparatus extending over the length of the probe, and with the voltage drop in the line section being measured as a measure of the liquid level.

The container is intended to be not only, but in particular, a container which is carried by a motor vehicle for liquefied low-boiling-point gases, for example hydrogen, which is used as fuel. Liquefied low-boiling-point gases are stored in conditions (pressure and temperature) in which the state variables of the liquid phase and of the gaseous phase differ only slightly. This makes it harder to carry out an accurate measurement using conventional methods.

However, accurate determination of the amount of fuel which is still present is necessary for use in a motor vehicle, for safety reasons and for full utilization of the range of a container filling. It is also desirable to monitor the temperature of the container contents. In addition, there are certain exacerbating factors which are typical of driving operation; for example the fact that the position of the liquid level is influenced by the inclination of the vehicle and by centrifugal forces.

A filling level detector of this generic type is known from WO 91/08449. There, the probe is a stiff rod which comprises a tubular mechanical support, a superconducting layer over the entire area, which is separated therefrom by a substrate, and a resistance heating element which is arranged in the interior of the tube and is supported by an electrical insulator on the inner wall of the tube. The heating element ensures that the suitably selected superconducting layer is not actually superconducting in the area of the cold liquid vapors, although it is in the area that is immersed in the liquid. Electrical connections for the resistance measurement are, so to speak, passed from the outside to the superconducting layer. This probe has the disadvantage of considerable physical complexity and the exposed position of the electrical connections and conductors.

The object of the invention is to provide a filling level detector which is insensitive and costs little, is suitable for mass production and can be used for containers of different sizes and different shapes.

SUMMARY OF THE INVENTION

According to the invention, the foregoing object is achieved in that the probe is a flat conductor which comprises a plurality of conductors which are routed parallel in a plastic sleeve, of which a first conductor is a superconductor with a suitable selected critical temperature, pairs of second conductors are used to supply heating current to the first conductor, and pairs of third conductors are used for voltage measurement, with the conductors in one pair each being connected to points which are at a distance from one another in the longitudinal direction of the probe.

Flat conductors are known per se (EP Patent from the Company I & T Innovation Technology AG). They comprise conductive film strips which are located alongside one another on one plane, and are extrusion-coated, such that they are insulated from one another, by a matrix, in general an insulating plastic. Flat conductors are a low-cost mass-produced product which can be cut to any desired length "from the roll" and can be provided with connections, terminations and openings at any desired points, for which purpose simple and rapid methods and apparatuses are known. In the cryogenic environment and in conjunction with the disposition according to the invention and distribution of the tasks of the individual conductors, this technology has even further advantages. Furthermore, flat conductors can be produced in a different constellation in terms of the number and character of the conductors and the cross section of the matrix.

As one aspect of the invention, the first conductor in the flat conductor is thus composed of a suitable superconductor material and the cross section of the matrix can be selected such that it is flexible and also has a specific stiffness. Furthermore, the connections for the pairs of second conductors for supplying heating current to the superconductor are made at points at a distance from one another in the vertical direction. The superconductor is therefore at the same time its own heating conductor. The area between a pair of second conductors covers the possible positions of the liquid level. A plurality of such areas can be formed over the length of the flat conductor. The flat conductor then also contains a plurality of pairs of second and third conductors.

In order to heat the liquid (which leads to increased vaporization) as little as possible and in order to ensure that the superconductor responds quickly to level changes, the plastic sleeve of the flat conductor is a poor heat conductor and has cutouts (interruptions) in places only in the vicinity of the first conductor (on the superconductor), in such a way that the first conductor can make contact with the liquid at these points.

If the aim is to carry out a temperature measurement in addition to the filling level measurement, the flat conductor contains further conductors for temperature measurement. As explained above, a flat conductor that has been broadened in this way requires a minimal amount of additional complexity. The plastic sleeve on the flat conductor may also have stiffening ribs, which run in its longitudinal direction, with a similarly small amount of additional complexity, in order to set a specific stiffness and, if required, as a spacer. The advantages of a flat conductor also include the fact that it can be terminated in an insulating manner at its free end in one simple process.

In a development of the invention, the probe is guided on a guide which is mounted in the interior of the container, at least in places. The flat conductor is therefore held in its place even when vibration occurs in the vehicle. If the flat conductor is selected to be suitably stiff, the guide does not need to follow a straight line.

The guide is preferably a tube whose interior contains the probe and forms a communicating vessel with the content of the container. The communication is produced at specific points through openings in the tube and results in the position of the liquid level in the container also being the level in the tube. This allows fluctuations in the liquid level to be damped, thus improving the accuracy of the measurement.

In one advantageous embodiment, one end area of the tube passes through the container wall, is connected (for example welded) to it in a sealed manner and contains a detachable bushing for the end area, facing the electronics part, of the probe which is located in the tube. The sealing of the container, which in general comprises an inner container and an outer container with an evacuated space between them, is therefore also ensured at the junction point between the probe and the electronics part, which is arranged outside the container. Because the bushing is detachable, the probe can be replaced.

The invention offers the particularly advantageous capability for use in a motor vehicle to measure the filling level at two points, which are at a distance from one another in the horizontal direction, on the container using a single probe according to the invention. For this purpose, the guide with the probe passes through the liquid level at at least two points in the interior of the container, and the superconductor therefore forms at least two measurement sections.

BRIEF DESCRIPTION OF THE DRAWINGS

The invention will be described and explained in the following text with reference to figures, in which.

DETAILED DESCRIPTION

Figure 1:
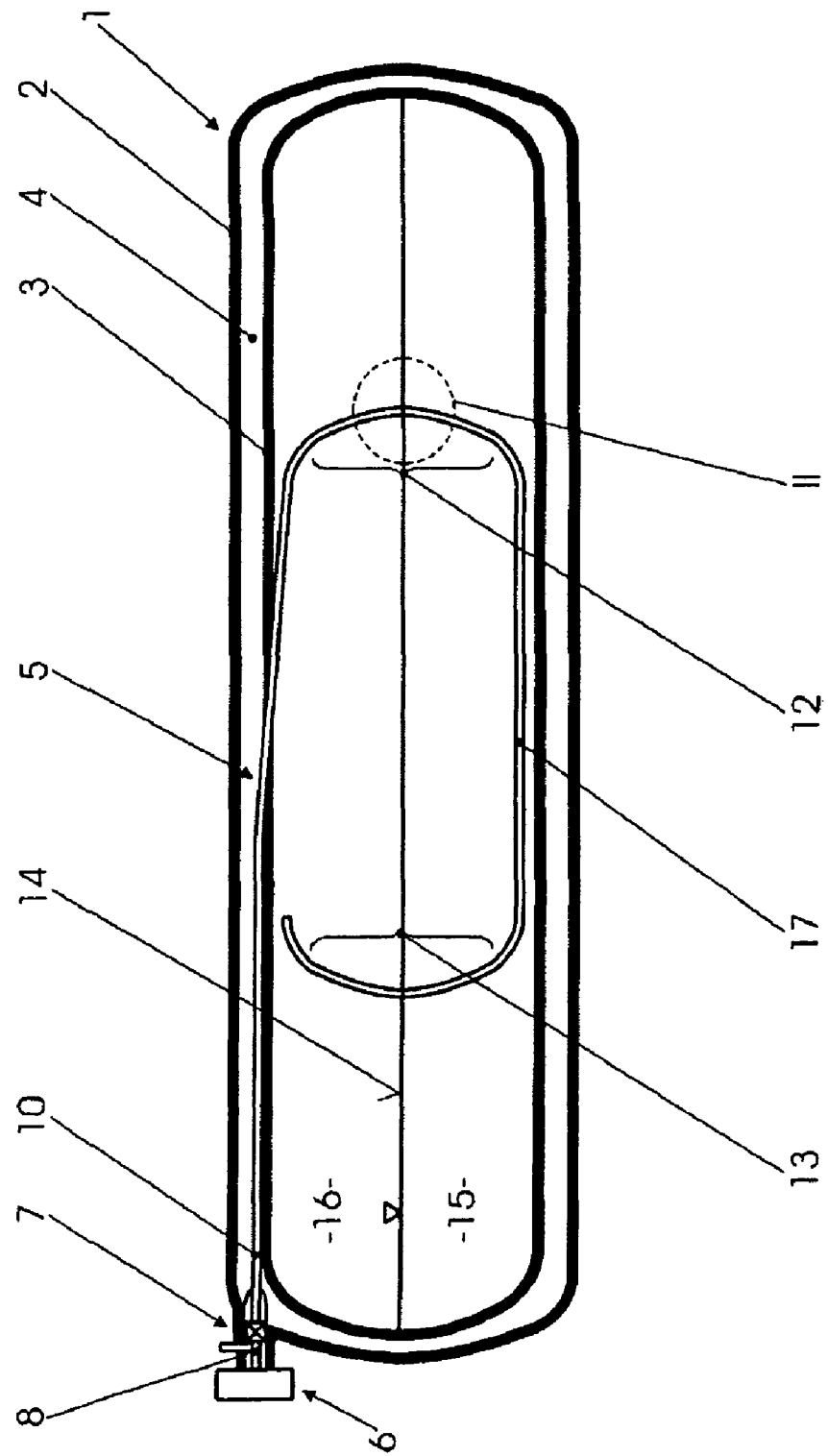
FIG. 1 shows a longitudinal section through a container with the probe according to the invention.

In FIG. 1, a container for a cryogenic liquid (in this case: hydrogen) is annotated, in summary form, with 1. It comprises an outer container 2 and an inner container 3, between which there is an evacuated and thermally insulating intermediate space. A filling level detector is annotated in general with 5 and its electronics part 6 is located outside the container 1 and is connected to a flange 7 and a guide 10, which is in the form of a tube and extends via a bushing 8 into the interior of the container. Only the tube 10 can be seen in FIG. 1, and the probe 11 which is guided in it can be seen for the first time in FIG. 2. The tube 10 extends from above into the inner container 3, then extends downwards over a first measurement region 12 and further over the section 17 to a second measurement region 13, which is at a distance therefrom in the horizontal direction. It extends therein upwards up to its open end. The liquid level in the container 1 is annotated with 14, with the liquid below this level and the gas area 16 above it. The liquid phase 15 and the gaseous phase 16 are in equilibrium with one another.

Figure 2:
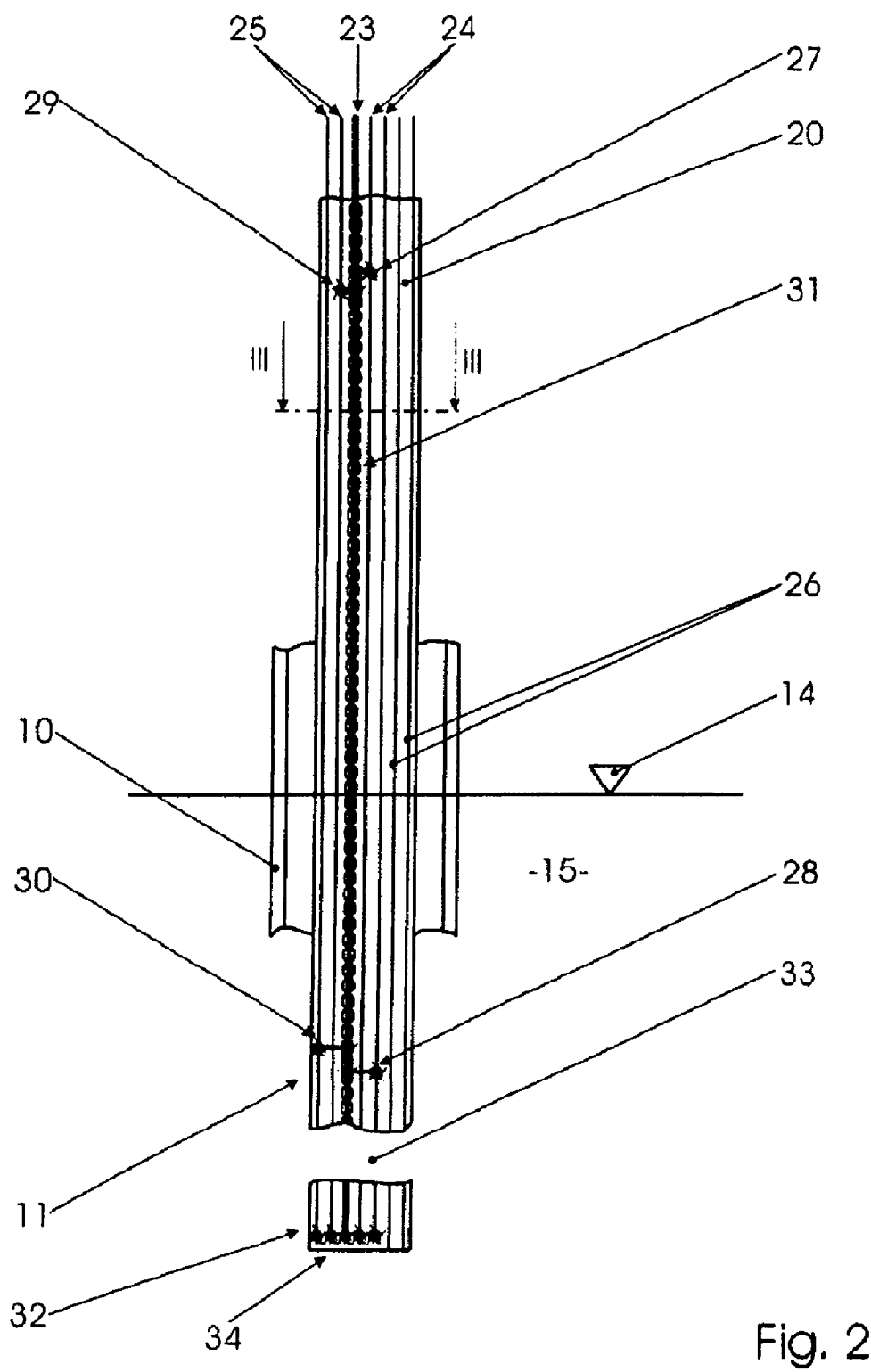
FIG. 2 shows the detail II in FIG. 1, the probe.
Figure 3:
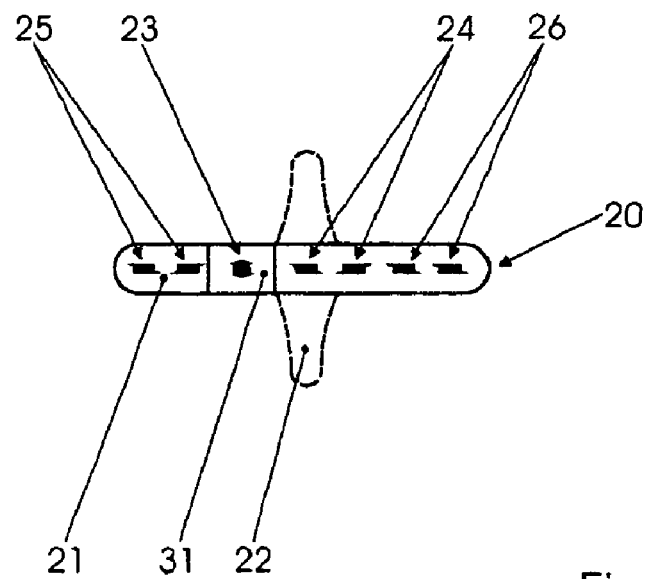
FIG. 3 shows a section along III-III in FIG. 2.

FIG. 2 and FIG. 3 show, enlarged, a part of the tube 10 and a part of the probe 11 which is held by it. The probe 11 is in the form of a flat conductor 20, which comprises a plastic matrix 21 and the conductors embedded in the matrix. The plastic matrix 21 may have stiffening ribs 22 (shown by dashed lines) for stiffening and guidance of the flat conductor 20. The conductors themselves are flat and are embedded by extrusion coating in the matrix. A first conductor 23 is composed of a superconducting material whose critical temperature matches that of liquid hydrogen, for example magnesium diboride ($MgB_2$) . A pair of second conductors 24 are used to supply heating current to the superconductor 23, and a pair of third conductors 25 are used for voltage measurement, to be more precise: the measurement of the voltage drop caused by the resistance of the first conductor 23. In the illustrated exemplary embodiment, a further pair of second conductors 26 are also provided, because the probe 11 is intended to measure the filling level in two measurement regions 12, 13 at a distance from one another.

One of the advantages of flat conductors is that simple methods of operation and apparatuses exist for connection and for termination of individual conductors (see for example U.S. Pat. No. 6,936,788 or EP 1084912 B1). Therefore, the second conductors 24 are connected to the first conductor 23 at two points at a distance from one another, with the connections being at a distance from one another in the longitudinal direction of the flat conductor 20 which corresponds approximately to the height of the first measurement region 12. The connections are annotated with 27 and 28. The third conductors 25 are connected to the first conductor 23 at the second connections 29, 30 (one at the connection 29, one at the connection 30). A further pair of third conductors 26 are provided for the second measurement region 13.

In order to improve and speed up the heat transfer to the first conductor 23, the matrix 21 of the flat conductor 20 has cutouts 31 at regular intervals, through which the liquid directly touches the superconductor. The flat conductor 20 then extends further (downwards in FIG. 2, but horizontally according to FIG. 1) to the second measurement region 13, which is shown cutaway in FIG. 2 in order to simplify the illustration, at 33. It is now easier to see the end of the flat conductor 20, at which all of the conductors which are contained in the flat conductor 20 are interrupted. A simple apparatus also exists for this purpose for flat conductors. The free end 34 does not require any further insulation, provided that it is not supported on a metallic part.

The tube 10, which is used as a guide, is connected at various points, which are not shown in detail, to the interior of the container, such that the liquid level 14 is also the same in the interior of the tube 10, such that the interior of the tube thus forms a vessel which communicates with the container contents. If the flat conductor is flexible and is still sufficiently stiff, then it can be introduced into the tube 10, with all its curves, from the outside through the flange 7, for installation and replacement.

Figure 4:
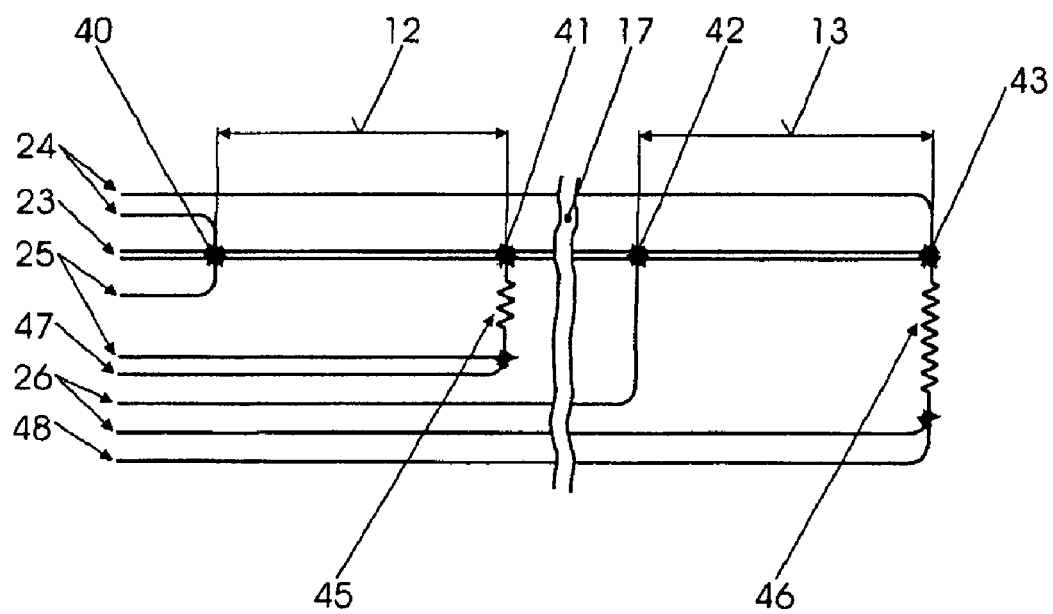
FIG. 4 shows, schematically, the electrical connections of the conductors.

FIG. 4 shows the various conductors drawn apart from one another laterally with respect to the length of the flat conductor 20, for the sake of clarity. The superconductor 23 forms the first measurement region 12 between the connecting points 40 and 41, and the second measurement region 13 between the connecting points 42 and 43 with the section 17, which is horizontal in FIG. 1, being between them, cutout in this case. The conductors 24 for the heating current make contact with the superconductor at the points 40 and 43, as a result of which the heating current flows through the entire superconductor 23. The conductors 25 for the measurement of the voltage drop in the first region 12 are connected to the points 40 and 41, and the conductors 26 for the second region 13 are connected to the points 42 and 43.

Optionally and in addition to the conductors shown in FIG. 2, a temperature measurement can also be provided. For this purpose, measurement elements 45, 46 (for example temperature-dependent resistors) are connected to the points 41 and 43. The current flowing through the measurement elements 45, 46 is measured on the additional lines 47, 48. A pressure sensor could also be provided in a similar manner, for which purpose further conductors would also have to be provided in the flat conductor. The use and connection of the various conductors is described here by way of example, and may be modified in many ways.

The invention claimed is:

1. A filling level detector for cryogenic liquids which are located in a container, which filling level detector comprises a probe immersed in a cryogenic liquid, the probe is guided on a guide which is mounted in an interior of a container, wherein the guide passes through the cryogenic liquid at at least two points in the container, an electronics part having a superconducting line section, a heating apparatus extending over the length of the probe, and means for measuring the voltage drop in the superconducting line section as a measure of the liquid level, the probe comprises a flat conductor which comprises a plurality of conductors which are routed parallel in a plastic matrix, the plurality of conductors comprise:

(a) a first conductor in the form of a superconductor with a suitable selected critical temperature, the superconductor forms at least two measurement sections;

(b) at least one pair of second conductors to supply heating current to the first conductor; and (c) at least one pair of third conductors used for voltage measurement, wherein the plurality of conductors are connected to points which are at a distance from one another in a longitudinal direction of the probe, and the plastic matrix of the flat conductor has stiffening ribs which run in the longitudinal direction.

2. A filling level detector for cryogenic liquids which are located in a container, which filling level detector comprises a probe immersed in a cryogenic liquid, the probe is guided on a guide which is mounted in an interior of a container, the guide is a tube having an interior which contains the probe and forms a communicating vessel with the cryogenic liquid of the container, wherein the tube passes through a container wall, is connected to the container wall in a sealed manner and contains a detachable bushing for an end area, facing an electronics part, of the probe which is located in the tube, the electronics part having a superconducting line section, a heating apparatus extending over the length of the probe, and means for measuring the voltage drop in the superconducting line section as a measure of the liquid level, the probe comprises a flat conductor which comprises a plurality of conductors which are routed parallel in a plastic matrix, the plurality of conductors comprise:

(a) a first conductor in the form of a superconductor with a suitable selected critical temperature;

(b) at least one pair of second conductors to supply heating current to the first conductor; and (c) at least one pair of third conductors used for voltage measurement, wherein the plurality of conductors are connected to points which are at a distance from one another in a longitudinal direction of the probe, and the plastic matrix of the flat conductor has stiffening ribs which run in the longitudinal direction.

3. The filling level detector according to claim 1 or 2, wherein the plastic matrix of the flat conductor has cutouts only in places in the vicinity of the first conductor, such that the first conductor can make contact with the liquid at these points.

4. The filling level detector according to claim 1 or 2, wherein the flat conductor includes additional conductors for temperature measurement.

5. The filling level detector according to claim 1 or 2, wherein a free end of the flat conductor is provided with insulation.

* * * * *